Dec. 26, 1967 M. A. STRUMOR 3,359,674
ADJUSTABLE FISHING LURE
Filed July 13, 1965
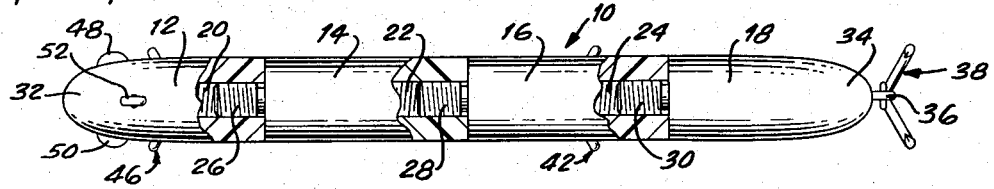
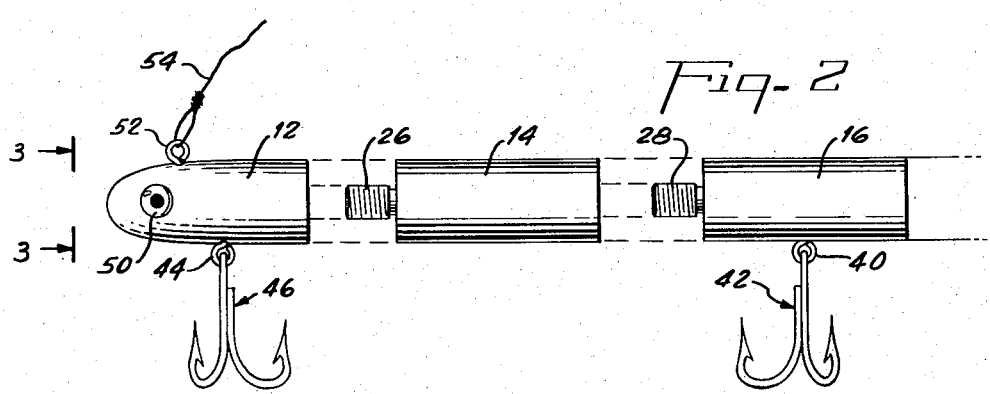
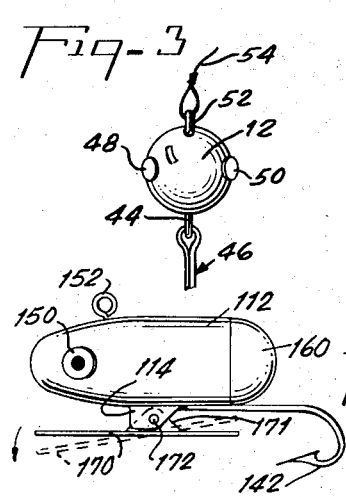
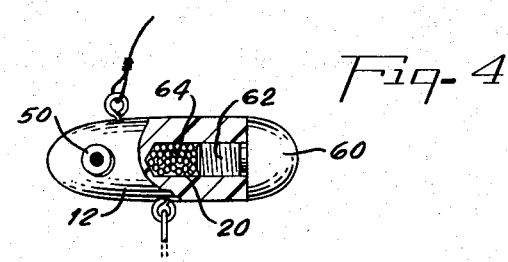
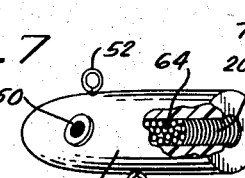
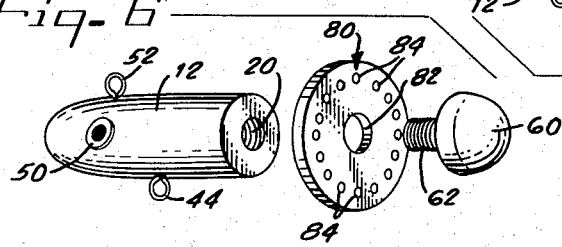
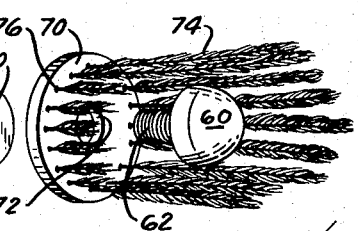
INVENTOR.
MATHEW A. STRUMOR
BY
*Buskin & Goldfarb*
ATTORNEYS

United States Patent Office 3,359,674
Patented Dec. 26, 1967

3,359,674
ADJUSTABLE FISHING LURE
Mathew A. Strumor, 27 Glenbrook Drive,
New Rochelle, N.Y. 10801
Filed July 13, 1965, Ser. No. 471,597
4 Claims. (Cl. 43—42.06)

ABSTRACT OF THE DISCLOSURE

A fishing lure comprising a plurality of cylindrical sections having adjacent ends provided with cooperating externally threaded studs and internally threaded cavities so that said sections are detachably threadedly secured to each other with the studs extending partially into the cavities so that shot-like weights may be added in the cavities to adjust the attitude in which the lure rides. Of course, hook means are attached to at least one of the sections, and a disc having a central aperture is disposed between two of the adjacent ends of the cylindrical sections, the disc having a larger diameter than the diameter of any of the cylinders and having holes therethrough with or without feathers attached thereto.

---

This invention relates to the art of fishing lures and more particularly to an interchangeable and adjustable fishing lure.

When fishing, the type of lure used for each particular game fish is of utmost importance as being necessary to intrigue and interest each particular species of game fish. To this end, most fishermen must maintain an extremely large selection of lures of different sizes and shapes.

It is therefore the primary object of the present invention to provide an adjustable fishing lure which will serve to substantially reduce the number of different lures which a fisherman requires to actively fish for various species of fish.

A further object of the present invention resides in the provision of a fishing lure that is interchangeable and adjustable so that the lure can be changed in its dimensions, and in its attitude, in it weight, appearance and in the effect it has when trolling, without requiring the removal of the fishing lure from the fishing line.

A further object of the invention resides in the provision of a fishing lure which by means of simple manipulation and addition or subtraction of parts may be made longer or shorter, heavier or lighter, provided with more or less hooks, provided with means for providing a bubbling conical shaped diverging wake, provided with different actions and attitudes, so that the fishing lure may ride higher or lower, and which may be provided with suitable feather means for camouflaging the hook or for providing color or otherwise attracting fish.

The concept of this invention features a fishing lure including a plurality of cylindrical sections having their adjacent ends provided with cooperating externally threaded studs and internally threaded cavities. Thus, the sections may be detachably threadedly secured to each other with the studs extending partially into the cavities. To this end, the front section may be attached to the fishing line, and thereafter one or more additional sections may be secured to the front section in an adjustable manner. The front end and the rear end are substantially hemispherically shaped. Suitable weights may be added to the cavities to adjust the attitude of the fishing lure so that it may skip, slide, glide or travel in various manners as the fishing lure moves through the water. Suitable disc means are either provided with perforations therethrough for causing a bubbling diverging substantially conical shaped wake or for camouflaging the fishing lure by surrounding at least the rear end portion of the fishing lure with feathers or the like, the feathers being of any color or shape as may be desired.

Still further objects and features of this invention reside in the provision of an adjustable fishing lure which is simple in construction, capable of being manufactured out of various readily available materials, such as polystyrene, polyvinyl chloride, polyethylene, nylon, Teflon, or the like, by molding or other suitable processes, which is extremely strong and resistant to corrosion, abrasion, and breakage, and which is effective in operation because it is highly attractive to fish.

These, together with the various ancillary objects and features of the present invention, which will become apparent as the following description proceeds, are attained by this adjustable fishing lure, preferred embodiments of which have been shown in the accompanying drawing, by way of example only, wherein:

FIG. 1 is a plan view of the adjustable fishing lure with parts being broken away to show the construction of other parts in detail;

FIG. 2 is an exploded side elevational view of portions of the fishing lure;

FIG. 3 is a front elevational view looking in the direction of arrows 3—3 in FIG. 2;

FIG. 4 is a side elevational view of the fishing lure in an assembled state when it is desired to have a lure of relatively small size;

FIG. 5 is an exploded perspective view showing certain camouflage means which may be used in conjunction with the invention;

FIG. 6 is an exploded perspective view showing a disc adapted to be used with the fishing lure for providing a suitable bubbling wake; and, FIG. 7 is an elevational view of a modified form of the invention.

With continuing reference to the accompanying drawings wherein like reference numerals designate similar parts throughout the various views, reference numeral 10 generally designates a fishing lure constructed in accordance with the concepts of the present invention. As shown in FIG. 1, the fishing lure includes a plurality of cylindrical sections 12, 14, 16 and 18. The sections 12, 14 and 16 are each provided with an internally threaded cavity 20, 22 and 24 therein for reception of externally threaded studs 26, 28 and 30 integrally formed with the sections 14, 16 and 18. The sections are threadedly secured to each other in a detachable manner so as to form a relatively smooth surface. The front section 12 is provided with a substantially hemeispherically shaped front end 32, while the rear section 18 is provided with a substantially hemispherically shaped rear end 34. Connected to the rearmost portion of the section 18 is an eyelet 36 for pivotally mounting a hook assembly generally indicated at 38 and of substantially conventional construction. Depending from other sections, such as the section 16, is an eyelet 40 to which a hook assembly 42, similar to the hook assembly 38, is pivotally secured. An eyelet 44, similar to the eyelet 40 for carrying a hook assembly 46, may be secured to the front section 12 as may be simulated eye pieces 48 and 50 and an eyelet 52 to which the leader 54 of the fishing line may be attached. As can be readily seen, any number of sections 14 and 16 can be utilized. Thus, the precise shape and dimensions of the fishing lure can be varied at will.

As shown in FIG. 4, in lieu of section 18, a cap-like hemispherical piece 60 may be employed, which is provided with a stud 62 which is externally threaded for engagement within the cavities 20, 22 or 24 so as to provide for a fishing lure without a hook at the end thereof and for allowing for a relatively small size fishing lure to be constructed. Further, as shown in FIG. 4, weights in the form of shots or lead sinkers 64 of any suitable size and dimension may be inserted in the cavities 20, 22 and 24. It is contemplated that the adjustable lure can be adjusted in size and weight without necessitating additional weight to range from one-quarter ounce to one and one-half ounces in its weight. Additional weight 64 can also be added so as to change the attitude of the fishing lure as it rides through the water.

As can be readily noted, it is not necessary to remove the fishing lure from the leader when it is desired to change the shape of the fishing lure. This is because the section 12 may remain in place and various other sections may be added as is desired.

As is shown in FIG. 5, there may be disposed between adjacent sections a suitable disc 70 which is provided with a central aperture 72 therein through which a stud, such as a stud 62 or the studs 26, 28 and 30, can readily extend so that when the stud 62 is threadedly engaged in the corresponding recess as at 20, the disc is firmly held in place. A plurality of feathers 74 may be affixed within perforations or openings 76 in the disc 70 or otherwise secured thereto and these feathers may extend rearwardly of the section 60 or any other section as used so as to camouflage or change the appearance of the fishing lure. Of course, the feathers can be artificial or natural and may be of any suitable color or shape as is desired to more greatly intrigue the game fish being sought. In lieu of the disc 70, a disc, generally indicated at 80, FIG. 6 may be provided, which also has a central aperture 82 therethrough and a plurality of annularly spaced perforations 84. The disc 80 as is the disc 70 is of a larger diameter than that of any of the sections 12, 14, 16, 18 or 60. To this end, when the lure is towed with the disc in place, the shape of the disc and the apertures will cause a diverging conical bubbling wake to be formed. The discs 70 and 80 will also cause the bait to move in a skidding manner, simulating the movement of a small fish.

In FIG. 7 there is shown a modified form of the invention wherein by way of one or more ears 114, which is attached to a front section 112, a diving plane 170 may be pivoted to the ear 114 by a pin or rivet 172 which passes through the ear or ears 114 and through a projection 171 extending upward from the diving plane 170 and fitting between the ears 114 if a pair are utilized, or adjacent the single ear if such is provided. The section 112 may be provided with simulated eyes 150, an eyelet 152, and any suitable hook 142 may also be appended thereto. An end section 160, similar to the end section 60, may be utilized. In this form of the invention, the rivet 172 may provide a very snug friction fit between the projection 171 and the ears 114 so that the plane 170 is set at any angle and will remain in this set position while travelling through the water, because the frictional position which has been set is sufficient to resist the force of the flow of water thereover and to cause the fishing lure to move in a pattern predetermined by the fitting of the diving plane 170. This will cause the lure to either dive or skip as may be desired.

The entire fishing lure may be made, with the exception of the hooks, which employ suitable metallic material, out of synthetic plastic materials, such as polystyrene, polyvinyl chloride, polyethylene, nylon, Teflon, or any other suitable material, and is quite simple to manufacture. Further, it is contemplated that the sections may be colored similarly to each other or of different colors to be used for different types of game fish as may be desired.

A latitude of modification, substitution and change is intended in the foregoing disclosure, and in some instances, some features of the invention will be employed without a corresponding use of other features. Accordingly, it is appropriate that the appended claims be construed broadly and in a manner consistent with the spirit and scope of the invention herein.

I claim:

1. A fishing lure comprising a plurality of cylindrical sections of synthetic plastic material, having adjacent ends provided with cooperating axially extending externally threaded studs and axially extending internally threaded cavities so that said sections are detachably threadedly secured to each other with said studs extending at least partially into said cavities, a plurality of removable shot weights further filling at least one of said cavities for adjustably controlling the attitude in which said lure rides, hook means pivotally attached to at least one of said sections, two of said sections having ends remote from said adjacent ends being substantially hemispherically shaped, a disc having a central aperture therethrough disposed between two of said adjacent ends with said one of said studs extending through said aperture, said disc having a larger diameter than the diameter of any of said cylinders.

2. A fishing lure according to claim 1, including annular perforation means in said disc for forming an outwardly diverging bubbling wake.

3. A fishing lure according to claim 1, including annularly spaced feather means attached to said disc, said feather means extending rearwardly of said lure and substantially surrounding the rearmost of said sections.

4. A fishing lure according to claim 1, including diving plane means adjustably pivotably suspended beneath one of said sections.

References Cited
UNITED STATES PATENTS

| | | | |
|---|---|---|---|
| 402,231 | 4/1889 | Coles | 43—43.14 |
| 1,069,093 | 7/1913 | Faught | 43—42.28 |
| 1,867,458 | 7/1932 | Keuper | 43—42.09 |
| 2,538,181 | 1/1951 | Yates | 43—42.22 |
| 3,023,537 | 3/1962 | Madson | 43—42.22 X |
| 3,069,801 | 12/1962 | Mills | 43—42.09 X |
| 3,121,291 | 2/1964 | Iffland et al. | 43—42.06 X |

SAMUEL KOREN, *Primary Examiner.*

D. J. LEACH, *Assistant Examiner.*